United States Patent
Crawford, Jr.

(10) Patent No.: US 7,752,623 B1
(45) Date of Patent: Jul. 6, 2010

(54) SYSTEM AND METHOD FOR ALLOCATING RESOURCES BY EXAMINING A SYSTEM CHARACTERISTIC

(75) Inventor: Isom Lawrence Crawford, Jr., Royse City, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1512 days.

(21) Appl. No.: 10/942,298

(22) Filed: Sep. 16, 2004

(51) Int. Cl.
*G06F 9/46* (2006.01)
*G06F 9/455* (2006.01)

(52) U.S. Cl. ............... 718/104; 718/1; 718/102; 718/103

(58) Field of Classification Search ............ 718/104, 718/1, 102, 103, 105; 710/244; 711/173; 395/200.11; 712/290; 709/103, 220, 221, 709/223
See application file for complete search history.

(56) References Cited

U.S. PATENT DOCUMENTS

| | | | | |
|---|---|---|---|---|
| 5,848,270 A * | 12/1998 | DeLuca et al. | ............... | 718/105 |
| 6,587,938 B1 * | 7/2003 | Eilert et al. | ............... | 712/29 |
| 6,651,125 B2 * | 11/2003 | Maergner et al. | ............ | 710/244 |
| 6,986,137 B1 * | 1/2006 | King et al. | ............... | 718/104 |
| 7,103,745 B2 * | 9/2006 | Koning et al. | ............... | 711/173 |
| 7,140,020 B2 * | 11/2006 | McCarthy et al. | ............ | 718/104 |
| 7,181,743 B2 * | 2/2007 | Werme et al. | ............... | 718/104 |
| 7,290,259 B2 * | 10/2007 | Tanaka et al. | ............... | 718/1 |
| 7,310,672 B2 * | 12/2007 | Rolia | ............... | 709/226 |
| 2002/0013802 A1 * | 1/2002 | Mori et al. | ............... | 709/1 |
| 2002/0120744 A1 * | 8/2002 | Chellis et al. | ............... | 709/226 |
| 2003/0037092 A1 * | 2/2003 | McCarthy et al. | ............ | 709/104 |
| 2003/0149685 A1 * | 8/2003 | Trossman et al. | ............... | 707/2 |

\* cited by examiner

*Primary Examiner*—Meng-Ai An
*Assistant Examiner*—Willy W Huaracha

(57) ABSTRACT

In one embodiment, a method for allocating resources in a shared resource domain comprises gathering performance data for multiple applications, determining that an application of the multiple applications is not achieving a service level objective (SLO), calculating an additional amount of a resource for the application estimated to cause the application to achieve the SLO, and examining, before initiating reallocation operations, at least one system characteristic to determine whether the calculated additional amount of the resource would improve performance of the application.

18 Claims, 2 Drawing Sheets

SYSTEM AND METHOD FOR ALLOCATING RESOURCES BY EXAMINING A SYSTEM CHARACTERISTIC

RELATED APPLICATION

The present application is related to U.S. patent application Ser. No. 10/206,594 entitled "Dynamic management of virtual partition computer workloads through service level optimization," filed Jul. 26, 2002, which is incorporated herein by reference.

TECHNICAL FIELD

The present invention is directed to allocation of resources within a computer system.

DESCRIPTION OF RELATED ART

Many enterprises have experienced a dramatic increase in the number of computers and applications employed within their organizations. When a business group in an enterprise deploys a new application, one or more dedicated server platforms are typically added to host the new application. This type of environment is sometimes referred to as "one-app-per-box." As more business processes have become digitized, a "one-app-per-box" environment leads to an inordinate number of server platforms. As a result, administration costs of the server platforms increase significantly. Moreover, the percentage of time that the server platform resources are actually used (the utilization rate) can be quite low. To address these issues, many enterprises have consolidated multiple applications onto common server platforms to reduce the number of platforms and increase the system utilization rates.

One issue associated with consolidating applications is the allocation of shared resources. For example, on a server platform that hosts three different database servers, if all three servers are busy, a mechanism is desirable to determine how much central processing unit (CPU) resources should be allocated to each server. Other shared resources may also be allocated such as memory, disk bandwidth, network bandwidth, and operating system resources (semaphores, inodes, open files, processes, etc.).

The most simple approach is to provide no explicit management mechanism to allocate shared resources. The multiple applications merely attempt to acquire resources as the resources become available. Typically, only server platforms that are highly overprovisioned may employ this approach. Otherwise, application performance will be unacceptably low.

A number of variations of "share" based scheduling are available for resource allocation. Share based scheduling is a resource allocation mechanism that assigns a percentage or share of the available resources to each application. For example, applications A, B, and C may each be assigned 33% of the available resources. If each application is busy, each application receives the defined share of resources. However, if any one application is idle, the other applications may acquire the unused resources.

SUMMARY

In one embodiment, a method for allocating resources in a shared resource domain comprises gathering performance data for multiple applications, determining that an application of the multiple applications is not achieving a service level objective (SLO), calculating an additional amount of a resource for the application estimated to cause the application to achieve the SLO, and examining, before initiating reallocation operations, at least one system characteristic to determine whether the calculated additional amount of the resource would improve performance of the application.

In another embodiment, a computing system comprises a plurality of computing resources, a plurality of computing domains, wherein a respective application, a manager process, and a respective performance monitoring process are executed in each of the plurality of computing domains, and an allocation process for allocating the plurality of computing resources between the plurality of computing domains, wherein when a manager process determines that performance data from its associated performance monitor does not satisfy a service level objective (SLO), the manager process is operable to (i) calculate an additional amount of the plurality of computing resources appropriate to achieve the SLO, (ii) to examine at least one system characteristic to determine whether the additional amount will improve performance of its associated application, and (iii) request the additional amount from the allocation process only when the additional amount is determined to improve performance of its application.

In another embodiment, a computer readable medium including executable instructions for facilitating reallocation of resources in a computing system that comprises code for generating performance data for a plurality of applications, code for detecting that an application is not achieving a service level objective using performance data from the code for generating, code for calculating an additional amount of a resource using performance data and a current allocation of the resource associated with the application, code for examining the application to determine whether improved performance of the application will result from allocation of the additional amount of the resource, and code for initiating reallocation operations only when the additional amount of the resource will improve performance of the application.

DETAILED DESCRIPTION

Figure 1:
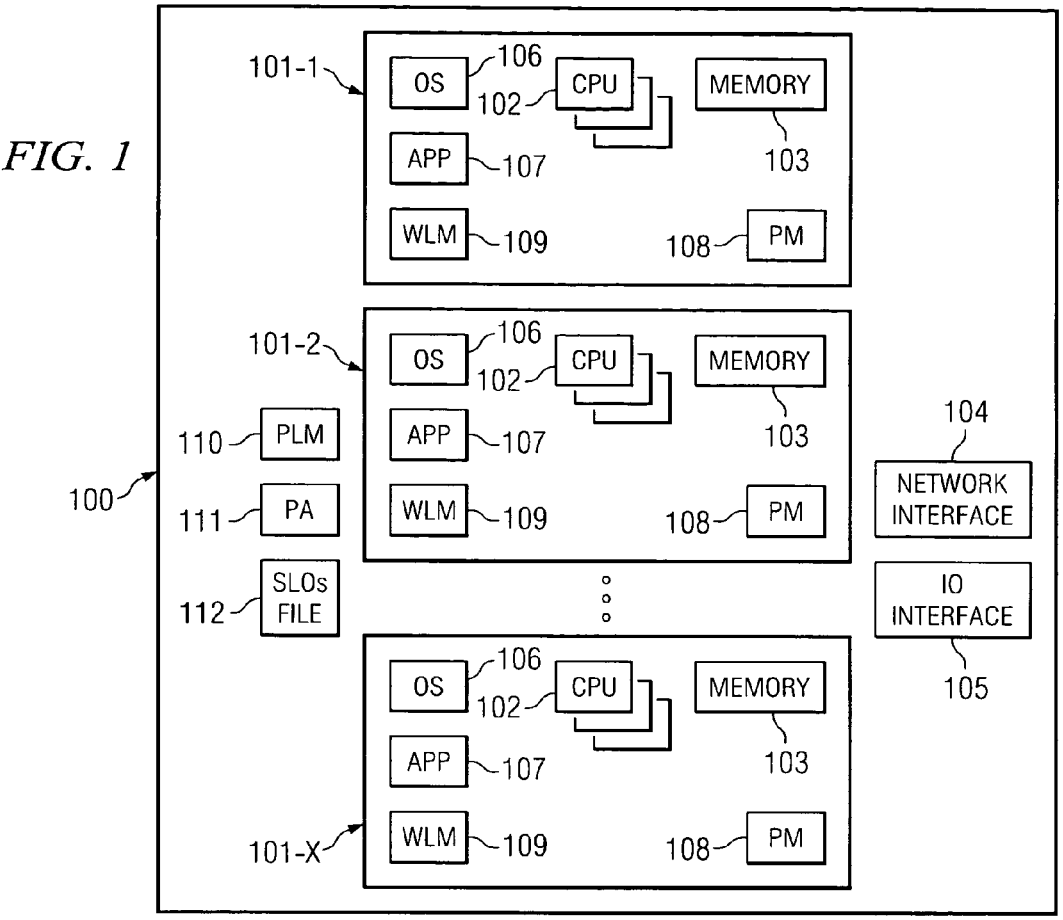
FIG. 1 depicts a system that dynamically allocates system resources according to one representative embodiment.

Referring now to the drawings, FIG. 1 depicts system 100 that dynamically allocates system resources according to one representative embodiment. System 100 includes a plurality of virtual partitions 101-1 through 101-X or other suitable computing domains. Virtual partitions 101 are protective domains of resources of a server platform. Specific portions of memory 103 and selected processors 102 of the server platform may be allocated between partitions 101-1 through 101-X. Partitions 101 may share resources such as network interface 104 and input/output (IO) interface 105. Suitable queuing and scheduling mechanisms (not shown) may be used to allocate access to network interface 104 and IO interface 105 as an example. Although one representative embodiment is described as using partitions, any suitable computing environment may be used to implement embodiments. Specifically, any computer system having at least one resource subject to allocation may employ an embodiment to determine which software processes are to receive access to the resource.

A discrete operating system 106 may be executed to control the processing within each partition 101. Respective applications 107 or sets of applications are executed within partitions 101-1 through 101-X. Applications 107 may correspond to the business processes of various business units of a corporate entity, for example. The use of partitions enables a number of advantages. For example, if a software error or fault occurs within any partition 101, only that partition 101 will be affected and the other partitions 101 will continue processing without interruption.

In one embodiment, within partitions 101-1 through 101-X, performance monitors 108 are software processes that monitor operations associated with applications 107. For example, performance monitors 108 may examine the length of time required to perform selected types of transactions. Additionally or alternatively, performance monitors 108 may monitor the utilization rates associated with the processors, IO peripherals, network interfaces, or other resources by the applications 107 associated with partitions 101-1 through 101-X. The performance metrics gathered by performance monitors 108 are communicated to workload managers (WLMs) 109.

In one embodiment, WLMs 109 are software processes that use the performance metrics to allocate resources within partitions 101-1 through 101-X to achieve service level objectives (SLOs) as stored in SLO file 112. An SLO is a desired operating goal for determining resource allocation decisions. For example, an SLO may be defined to specify the desired length of time to complete a specific type of database transaction to equal one millisecond. Alternatively, an SLO may be defined to specify that the utilization rate of a resource should be maintained below 85%. If one of WLM 109 is unable to cause the respective SLO(s) to be obtained through allocation within a given partition 101, the WLMs 109 may communicate a request to partition load manager 110 to obtain additional resources.

In one embodiment, partition load manager 110 is a software process that determines how to allocate resources between partitions 101 and partition allocator 111 is a software process that performs the low-level operations associated with the determined allocations. Partition load manager 110 and partition allocator 111 may be executed within a dedicated partition 101 or within a partition associated with other applications. Partition load manager 110 responds to requests from work load managers 109 by causing partition allocator 111 to assign additional resources or reassign resources to the requesting partition or by refusing the request. For example, a processor or set of processors could be removed from one partition 101 and assigned to another partition 101 to address the failure to achieve an SLO. In one embodiment, the SLOs may also be encoded using several tiers of objectives with each tier having a relative priority. PLM 110 may allocate system resources to achieve the highest possible SLO tier given the current performance data. The reallocation of resources may involve reallocation of idle resources and/or reallocation of used resources from applications of lower priority. Any suitable resource could be assigned in this manner such as memory, storage resources, networking resources, operating system resources, and/or the like.

Additional details related to implementing partitions, performance monitors, workload managers, partition allocators, and partition load managers may be found in U.S. patent application Ser. No. 10/206,594 entitled "Dynamic management of virtual partition computer workloads through service level optimization," filed Jul. 26, 2002, which is incorporated herein by reference.

In one representative embodiment, WLMs 109 consider system characteristics (e.g., application characteristics) and the granularity of allocation when determining whether to request addition resources for allocation to its partition 101. For example, some resource allocation mechanisms operate in a shared resource domain where processors 102 are assigned as discrete units, i.e., each processor 102 executes instructions for one only partition 101. If application characteristics or the granularity of allocation are not considered, reallocations may fail to improve application performance and the overall system performance may be reduced. Specifically, suppose an application is operating within a partition that possesses a single processor 102 with a utilization rate of 90%. Also, suppose an SLO is associated with the application that causes additional resources to be requested whenever processor utilization is above 85%. A request may be made by the WLM 109 for a fractional amount (e.g., an additional 0.1 share of a processor) of resources to reduce the utilization rate below 85%. However, because processors are only allocated upon a discrete basis, a full processor 102 may be allocated in response to the request. Now, if the particular application is a single process, single thread of execution, the additional processor 102 will not improve execution of the application. Specifically, a single thread of execution of a single process may only be executed in a linear manner and, hence, multiple processors cannot speed the execution of the thread.

Continuing with these assumptions, after allocation of the additional processor 102, the utilization rate will fall to 45% (i.e., 90% of the original processor 102 and 0% of the second processor 102). The utilization rate may trigger the WLM 109 to reduce the allocation of the partition 101 by communicating a request to reduce the allocation by a fractional amount. Again, the allocation of a processor 102 may only occur on a discrete basis. When the processor 102 is deallocated, the situation returns to its original state. A single processor 102 is allocated to the partition 101 and the processor 102 is utilized at a 90% rate. The allocation/deallocation operations may be continuously repeated as long as a processor 102 is available for reallocation to the respective partition 101.

Some representative embodiments address such issues by considering the granularity of allocation during reallocation operations. Additionally, the behavior or characteristics of a workload may be examined to determine whether the workload will benefit from an allocation of additional resources. By performing these operations, some representative embodiments enable a more efficient use of computing resources by avoiding reallocation operations that will have little effect. Also, by considering these factors, some representative embodiments may determine whether a larger increment/decrement in resources can be used. As a result, some representative embodiments will cause a faster adjustment to the demands of a workload thereby leading to a more efficient use of the computing resources.

Figure 2:
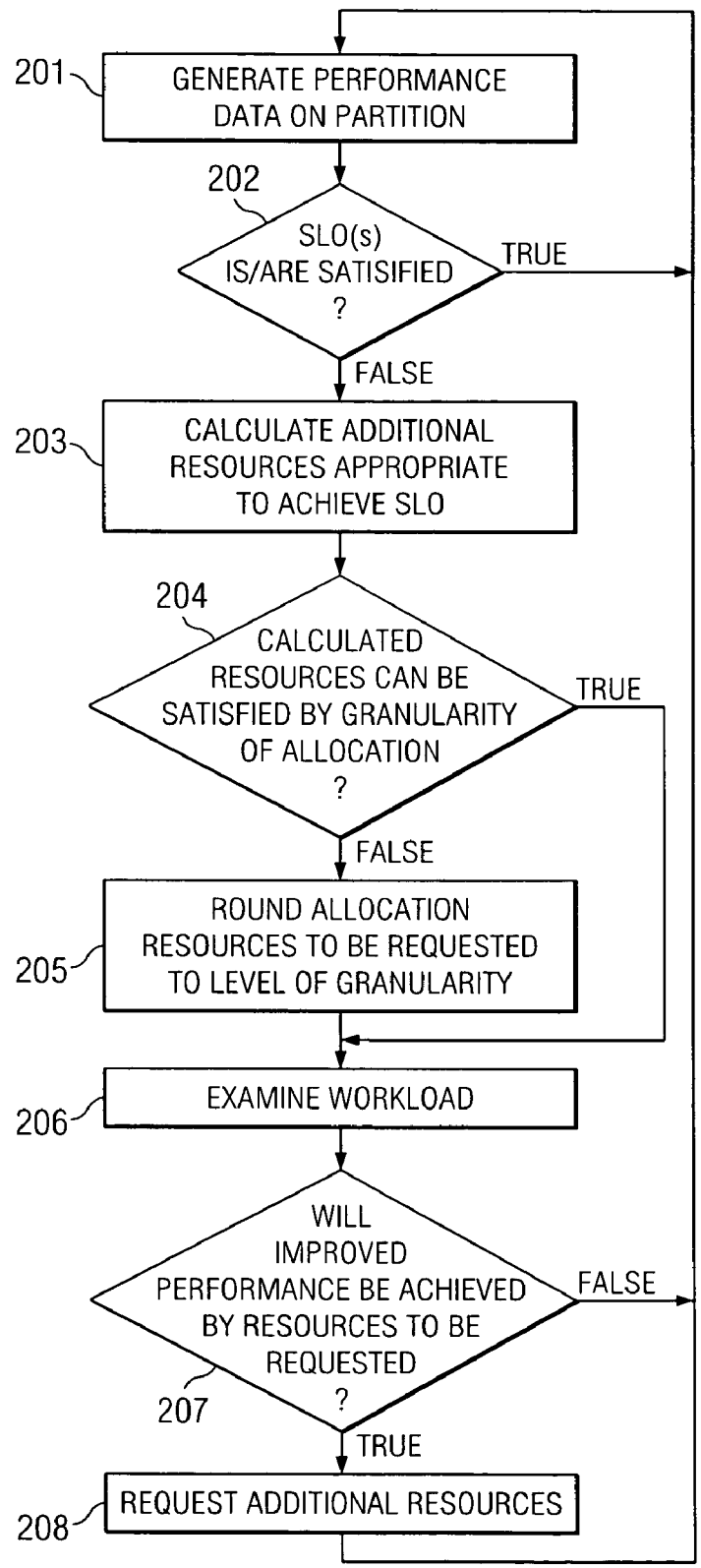
FIG. 2 depicts a flowchart for facilitating allocation of system resources according to one representative embodiment.

FIG. 2 depicts a flowchart for requesting resources from a dynamic resource allocation process according to one representative embodiment. The flowchart of FIG. 2 may be implemented using software instructions or executable code. For example, the flowchart of FIG. 2 may be implemented, in part, using WLM 109 software operations.

In block 201, performance data is generated on a partition 101 by performance monitor 108. The performance data is analyzed by WLM 109 beginning in block 202. In block 202, WLM 109 analyzes the performance data in view of one or several SLOs. A logical comparison is made in block 202 to determine whether the one or several SLOs are satisfied. If each SLO is being met, the process flow returns to block 201 where continued monitoring of the performance of application(s) within the partition 101 occurs. If an SLO is not satisfied, the process flow proceeds from block 202 to block 203.

In block 203, a calculation is made to determine an amount of resources appropriate to cause the respective SLO to be met. The calculation may generally occur in relation to the performance data associated with the partition 101, the current allocation of resources to the partition, and the SLO to be met. In block 204, a logical comparison is made to determine whether the calculated resources can be satisfied by the granularity of allocation. For example, the amount of resources may equal a fractional amount. Depending upon the allocation mechanism, it may only be possible to allocate discrete processors, e.g., time sharing of a processor would not occur between partitions 101. Accordingly, a fractional amount of a processor would not satisfy the granularity. If the calculated resources can be satisfied, the process flow proceeds from block 204 to block 206. Otherwise, the process flow proceeds to block 205 where the resources to be requested are rounded to the level of granularity.

In block 206, the workload is examined for the purpose of obtaining information relevant to whether the additional resources will benefit the workload. For example, the length of the run queue for the partition 101 or other container may be examined. If additional threads are contained within the run queue, it may be concluded that the workload is not being processed by a single thread of execution. In one representative embodiment, the length of the run queue may be examined using the "pstat" system call of Hewlett-Packard Company's HP-UX operating system. Any other suitable system call or other function call may be additionally or alternatively employed to determine the execution characteristics within the partition 101 or container. Alternatively, application characteristics may be known from a priori information and suitably statically encoded within a configuration file, data structure, or the like. In another embodiment, repetitive allocations and deallocations of a resource within a short period of time may be detected. The repetitive operations may indicate that the additional resource is not improving performance of the respective application. In response to the detection, a suitable data structure could be updated to reflect the application characteristic.

In block 207, a logical comparison is made to determine whether improved performance will be achieved by the resources to be requested. For example, if a single thread of execution is present in the partition 101 and the additional resources are one or several additional processors, improved performance would not be achieved. If the logical comparison of block 207 is false, the process flow returns to block 201 where continued monitoring of the workload occurs. If the logical comparison of block 207 is true, the process flow proceeds to block 208 where the additional resources are requested from PLM 110. PLM 110 would then allow or deny the request depending upon the workload of other partitions 101 and the defined SLOs. From block 208, the process flow returns to block 201 where continued monitoring of the workload occurs.

When WLM 109 determines that more resources are included within its partition 101 than appropriate to achieve the relevant SLO(s), WLM 109 may make resources available for deallocation in a manner similar to the operations described in FIG. 2. WLM 109 may analyze the granularity of the allocation operations and adjust the specification of excess resources in a message to PLM 110 according to the level of granularity. Also, WLM 109 may examine the application characteristics to determine the potential effects of deallocation upon the application executing within the respective partition.

Although one representative embodiment has been described as using WLM 109, other implementations may be employed. For example, the level of granularity and the application characteristics may be examined by PLM 110 after receiving a request for additional resources from a respective WLM 109.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The code segments may be downloaded via computer networks such as the Internet, intranet, etc.

Figure 3:
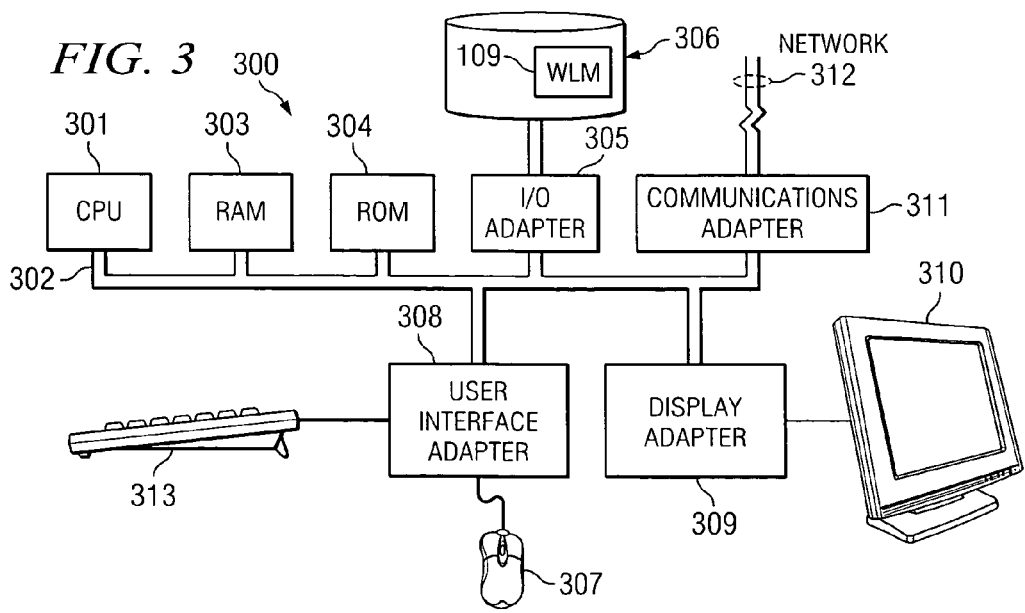
FIG. 3 depicts another system according to one representative embodiment.

FIG. 3 illustrates computer system 300 adapted according to one representative embodiment. Central processing unit (CPU) 301 is coupled to system bus 302. The CPU 301 may be any general purpose CPU. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

Bus 302 is also coupled to input/output (I/O) controller card 305, communications adapter card 311, user interface card 308, and display card 309. I/O card 305 connects to storage devices 306, such as one or more of hard drive, CD drive, floppy disk drive, tape drive, to the computer system. Storage devices 306 may store the software or executable code for managing the allocation of system resources. For example, storage devices 306 may store executable code implementing WLM 109 according to one representative embodiment.

Communications card 311 is adapted to couple the computer system 300 to a network 312, which may be one or more of local (LAN), wide-area (WAN), ethernet or Internet network. User interface card 308 couples user input devices, such as keyboard 313 and pointing device 307, to the computer system 300. Display card 309 is driven by CPU 301 to control the display on display device 310.

Some representative embodiments may provide a number of advantages. By considering the granularity of allocation operations and by examining application characteristics, some representative embodiments avoid allocations that do not improve application performance. Accordingly, overall system performance may be made more efficient by mitigating unprofitable operations.

What is claimed is:

1. A method for allocating resources in a shared resource domain, comprising:

gathering performance data for multiple applications;

determining that an application of said multiple applications is not achieving a service level objective (SLO);

calculating an additional amount of resources for said application estimated to cause said application to achieve said SLO;

examining, before initiating reallocation operations, at least one system characteristic, by performing a system call to examine the queue length of a run queue of a computing domain associated with said application and by comparing said additional amount to a level of allocation granularity associated with said resources, to determine whether said calculated additional amount of said resources would improve performance of said application; and requesting said additional amount only when said additional amount is determined to improve performance of said application.

2. The method of claim 1, wherein said examining comprises analyzing an application characteristic data structure associated with said application.

3. The method of claim 2, further comprising: updating a value of said application characteristic data structure in response to repetitive allocation and deallocation operations.

4. The method of claim 1, wherein said examining further comprises: adjusting said additional amount in response to said comparing.

5. The method of claim 4, wherein said resources comprise a plurality of processors.

6. The method of claim 5, wherein said multiple applications are executed in respective virtual partitions and each processor is assigned to only one partition.

7. The method of claim 1, further comprises: requesting said additional amount of said resources from a software process responsible for reallocation of resources between said multiple applications.

8. The method of claim 7, wherein said software process reallocates said additional amount of said resources after determining whether said additional amount of said resources is available.

9. The method of claim 8, wherein said determining whether said additional amount of said resources is available comprises: identifying idle resources.

10. The method of claim 8, wherein said determining whether said additional amount of said resources is available comprises: identifying resources assigned to applications of lower priority than said application.

11. A computing system, comprising:
a plurality of computing resources;
computer readable storage medium including executable instructions for facilitating reallocation of said plurality of computing resources in said computing system;
a plurality of computing domains, wherein a respective application, a manager process, and a respective performance monitoring process are executed in each of said plurality of computing domains; and
an executable allocation process for allocating said plurality of computing resources between said plurality of computing domains;
wherein when a manager process determines that performance data from its associated performance monitor does not satisfy a service level objective (SLO), said manager process is operable to (i) calculate an additional amount of said plurality of computing resources appropriate to achieve said SLO; (ii) to examine at least one system characteristic to determine whether said additional amount will improve performance of its associated application by performing a system function call to examine the queue length of a run queue of a computing domain associated with said application and by comparing said additional amount to a level of allocation granularity associated with said plurality of computing resources; and (iii) request said additional amount from said allocation process only when said additional amount is determined to improve performance of its application.

12. The computing system of claim 11, wherein said manager process performs said examining by analyzing application characteristic information statically encoded in a data structure.

13. The computing system of claim 11, wherein said plurality of computing resources comprise processors.

14. The computing system of claim 13, wherein each processor is assigned to only one of said plurality of computing domains and said manager process modifies said additional amount to equal an integer number of processors.

15. The computing system of claim 13, wherein said executable allocation process reallocates said additional amount by identifying idle resources.

16. The computing system of claim 13, wherein said executable allocation process reallocates said additional amount by identifying resources associated with applications of lower priority than the application associated with said requesting manager process.

17. A computer readable storage medium including executable instructions for facilitating reallocation of resources in a computing system, said computer readable medium comprising:
code for generating performance data for a plurality of applications;
code for detecting that an application is not achieving a service level objective using performance data from said code for generating;
code for calculating an additional amount of resources using performance data and a current allocation of said resources associated with said application;
code for executing a system function call to examine the queue length of a run queue of a computing domain associated with said application;
code for comparing said additional amount to a level of allocation granularity associated with said resources;
code for examining said application to determine whether improved performance of said application will result from allocation of said additional amount of said resources; and
code for initiating reallocation operations only when said additional amount of said resources will improve performance of said application.

18. The computer readable storage medium of claim 17, wherein said plurality of applications are executed in respective partitions.

* * * * *